US009509005B2

(12) United States Patent
Naganuma et al.

(10) Patent No.: US 9,509,005 B2
(45) Date of Patent: Nov. 29, 2016

(54) FUEL CELL SYSTEM (71) Applicant: Toyota Jidosha Kabushiki Kaisha, Toyota-shi, Aichi (JP)

(72) Inventors: Yoshiaki Naganuma, Toyota (JP); Hiromi Tanaka, Toyota (JP); Osamu Yumita, Nagoya (JP); Takayoshi Tezuka, Nagoya (JP); Nobukazu Mizuno, Miyoshi (JP); Masashi Fuji, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 511 days.

(21) Appl. No.: 14/498,482

(22) Filed: Sep. 26, 2014

(65) Prior Publication Data
US 2015/0017561 A1  Jan. 15, 2015

Related U.S. Application Data (62) Division of application No. 13/258,856, filed as application No. PCT/JP2010/057461 on Apr. 27, 2010, now Pat. No. 8,871,401.

(30) Foreign Application Priority Data

May 26, 2009  (JP) ................................ 2009-126317

(51) Int. Cl.
*H01M 8/04*  (2016.01)
*H01M 8/10*  (2016.01)

(52) U.S. Cl.
CPC ..... *H01M 8/04701* (2013.01); *H01M 8/04029* (2013.01); *H01M 8/0432* (2013.01);
(Continued)

(58) Field of Classification Search
CPC ............. H01M 8/04; H01M 8/04298; H01M 8/0432; H01M 8/04358; H01M 8/04701
USPC ........................................................ 429/437
See application file for complete search history.

(56) References Cited

U.S. PATENT DOCUMENTS

2003/0017375 A1   1/2003  Kanno
2005/0233201 A1  10/2005  Yoshizawa et al.
(Continued)

FOREIGN PATENT DOCUMENTS

CA        2646815 A1   10/2007
DE   112007000689 T5    2/2009
(Continued)

OTHER PUBLICATIONS

International Search Report mailed Jul. 20, 2010 of PCT/JP2010/057461.

*Primary Examiner* — Basia Ridley
*Assistant Examiner* — James Erwin
(74) *Attorney, Agent, or Firm* — Andrews Kurth Kenyon LLP (57) ABSTRACT

A fuel cell system suppresses the deterioration of an electrolyte membrane of a fuel cell. The fuel cell system comprises: a temperature rise speed calculation unit for calculating a target temperature rise speed of the fuel cell using a temperature of the fuel cell and a water content of the fuel cell; and a drive control unit for controlling a drive of the cooling water pump using the temperature rise speed of the fuel cell and the target temperature rise speed calculated by the temperature rise speed calculation unit. The drive control unit controls the drive of the cooling water pump such that a circulation amount of the cooling water is decreased when the temperature rise speed of the fuel cell is below the target temperature rise speed and controls the drive of the cooling water pump such that the circulation amount of the cooling water is increased when the temperature rise speed of the fuel cell is equal to or greater than the target temperature rise speed.

4 Claims, 4 Drawing Sheets (52) U.S. Cl.
CPC ..... *H01M8/04358* (2013.01); *H01M 8/04768* (2013.01); *H01M 8/04253* (2013.01); *H01M 8/04268* (2013.01); *H01M 8/04298* (2013.01); *H01M 2008/1095* (2013.01); *Y02E 60/50* (2013.01)

(56) References Cited

U.S. PATENT DOCUMENTS

| | | |
|---|---|---|
| 2006/0185626 A1 | 8/2006 | Allen et al. |
| 2007/0178342 A1 | 8/2007 | Hoch |
| 2009/0104484 A1 | 4/2009 | Fujimura et al. |
| 2010/0167148 A1 | 7/2010 | Manabe |

FOREIGN PATENT DOCUMENTS

| | | |
|---|---|---|
| JP | 09-231991 A | 9/1997 |
| JP | 11-067254 A | 3/1999 |
| JP | 2003-036874 A | 2/2003 |
| JP | 2005-327672 A | 11/2005 |
| JP | 2006-156084 A | 6/2006 |
| JP | 2007-220559 A | 8/2007 |
| JP | 2007-280827 A | 10/2007 |
| JP | 2007-299627 A | 11/2007 |
| JP | 2009-099264 A | 5/2009 |

FUEL CELL SYSTEM

CROSS-REFERENCE TO RELATED APPLICATIONS

This is a divisional of U.S. application Ser. No. 13/258,856, filed on Sep. 22, 2011, which is a 371 national phase application of PCT/JP2010/057461 filed Apr. 27, 2010, claiming priority to Japanese Patent Application No. 2009-126317 filed May 26, 2009, the contents of which are incorporated herein by reference.

TECHNICAL FIELD

The present invention relates to a fuel cell system.

BACKGROUND ART

A fuel cell generates electric power through an electrochemical reaction of an oxidant gas and a fuel gas, and further generates water. Water freezes at or below the freezing point. Thus, when the temperature inside the fuel cell is at or below the freezing point, the product water freezes. Therefore, when the fuel cell is activated in cold areas, etc., it is necessary to prevent the product water from freezing inside the fuel cell until the fuel cell is warmed up.

The below Patent Document 1 discloses a technique of, when the fuel cell is activated under a low temperature, increasing the temperature rise speed of the fuel cell by stopping a cooling water pump when the temperature inside the fuel cell is 0° C. or below and thereby preventing the product water from freezing.

PRIOR ART REFERENCES

Patent Documents

Patent Document 1: Japanese laid-open patent publication No. 2003-36874

SUMMARY OF THE INVENTION

Problem to be Solved by the Invention

When the cooling water pump is stopped, the circulation of the cooling water stops, and thus, the heat transference from the heat generated portion in the fuel cell decreases and a power generation concentrated portion is easily formed. When the power generation concentrated portion is formed, an electrolyte membrane of the fuel cell may be deteriorated.

The present invention is for overcoming the problems by the prior art described above, and its object is to provide a fuel cell system that is capable of suppressing the deterioration of the electrolyte membrane of the fuel cell.

Means for Solving the Problem

In order to solve the above problem, the fuel cell system according to the present invention comprises a fuel cell that is supplied with a reactant gas and generates electric power through an electrochemical reaction of the reactant gas; a cooling water circulation flow path for circulating and supplying cooling water to the fuel cell; a cooling water pump that circulates the cooling water in the cooling water circulation flow path; and a control means for controlling, during a low temperature activation, a drive of the cooling water pump in accordance with a temperature rise speed of the fuel cell.

According to the present invention, the drive of the cooling water pump can be controlled in accordance with the temperature rise speed of the fuel cell during a low temperature activation. Accordingly, for example, even if the fuel cell is activated at a low temperature at or below the freezing point, the circulation amount of the cooling water can be increased when the temperature rise speed of the fuel cell is high. Therefore, a situation where the circulation amount of the cooling water is insufficient which causes a power generation concentrated portion to be formed can be avoided.

In the above fuel cell system, the above control means may include: a target temperature rise speed calculation means for calculating a target temperature rise speed of the fuel cell using a temperature of the fuel cell and a water content of the fuel cell; and a drive control means for controlling a drive of the cooling water pump using the temperature rise speed of the fuel cell and the target temperature rise speed calculated by the target temperature rise speed calculation means.

This enables the target temperature rise speed to be calculated in accordance with the temperature and the water content of the fuel cell, and the drive of the cooling water pump to be controlled in accordance with the target temperature rise speed. Therefore, the circulation amount of the cooling water required for preventing the deterioration of the electrolyte membrane included in the fuel cell can be appropriately controlled.

In the above fuel cell system, the drive control means may control the drive of the cooling water pump such that a circulation amount of the cooling water is decreased when the temperature rise speed of the fuel cell is below the target temperature rise speed and control the drive of the cooling water pump such that the circulation amount of the cooling water is increased when the temperature rise speed of the fuel cell is equal to or greater than the target temperature rise speed.

This enables the circulation amount of the cooling water to be controlled easily.

In the above fuel cell system, the control means may include a target temperature rise speed calculation means for calculating the target temperature rise speed of the fuel cell using a temperature of the fuel cell and a water content of the fuel cell; and a drive control means for controlling the drive of the cooling water pump in accordance with a circulation amount of the cooling water that is calculated using the target temperature rise speed calculated by the target temperature rise speed calculation means.

This enables the target temperature rise speed to be calculated in accordance with the temperature and the water content of the fuel cell, and the drive of the cooling water pump to be controlled in accordance with this target temperature rise speed. Therefore, the circulation amount of the cooling water required for preventing deterioration of the electrolyte membrane included in the fuel cell can be appropriately controlled.

The above fuel cell system may further comprise a target circulation amount calculation means for calculating the target circulation amount of the cooling water using the target temperature rise speed, wherein the drive control means controls a drive amount of the cooling water pump in accordance with the target circulation amount.

This enables the circulation amount of the cooling water to be controlled more accurately.

In the above fuel cell system, the drive control means may stop the cooling water pump when a value obtained by subtracting the temperature rise speed from the target temperature rise speed is equal to or greater than a predetermined first threshold value.

This enables the temperature of the fuel cell to be raised rapidly since the cooling water pump can be stopped when the difference between the target temperature rise speed and the temperature rise speed is equal to or greater than a first predetermined value.

In the above fuel cell system, the drive control means may drive the cooling water pump when the value obtained by subtracting the temperature rise speed from the target temperature rise speed is equal to or smaller than a second threshold value which is a value that is equal to or smaller than the first threshold value.

This enables the inside of the fuel cell with a rising temperature to be cooled and thereby suppressing the formation of a power generation concentrated portion since the cooling water pump can be driven again when the difference between the target temperature rise speed and the temperature rise speed is decreased to a second threshold value or lower.

The above fuel cell system may further comprise a temperature sensor that is provided at the cooling water circulation flow path and measures the temperature of the cooling water, wherein the control means determines that the fuel cell is during the low temperature activation when the temperature detected by the temperature sensor during activation of the fuel cell is equal to or smaller than a predetermined low temperature threshold value.

Effect of the Invention

According to the present invention, the deterioration of the electrolyte membrane of the fuel cell can be suppressed.

MODE FOR CARRYING OUT THE INVENTION

Preferred embodiments of a fuel cell system according to the present invention will be described below with reference to the attached drawings. Each embodiment will describe an example where the fuel cell system according to the present invention is used as an in-vehicle power generation system for a fuel cell hybrid vehicle (FCHV). The fuel cell system according to the present invention may also be applied to various mobile objects other than fuel cell hybrid vehicles (e.g., robots, ships and airplanes) and also to stationary power generation systems used as power generation facilities for constructions (houses, buildings, etc.).

Figure 1:
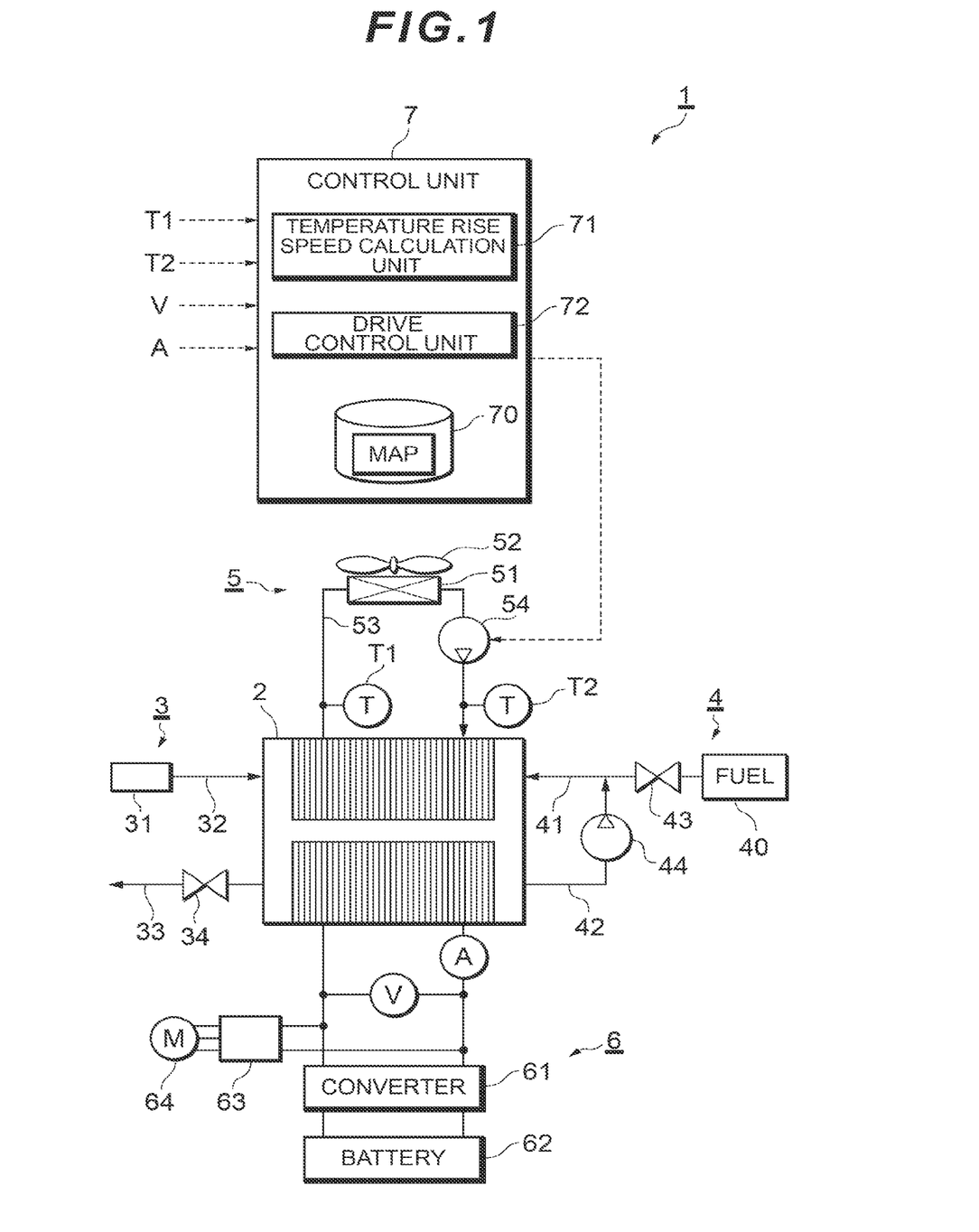
FIG. 1 is a configuration diagram schematically showing a fuel cell system in an embodiment.

First, the configuration of a fuel cell system in an embodiment will be described with reference to FIG. 1. FIG. 1 is a configuration diagram schematically showing the fuel cell system in an embodiment.

As shown in FIG. 1, the fuel cell system 1 includes: a fuel cell 2 that is supplied with an oxidant gas and a fuel gas as reaction gases and generates electric power through an electrochemical reaction; an oxidant gas piping system 3 that supplies air as the oxidant gas to the fuel cell 2; a fuel gas piping system 4 that supplies hydrogen as the fuel gas to the fuel cell 2; a cooling system 5 that circulates and supplies cooling water to the fuel cell 2; an electric power system 6 that charges and discharges an electric power of the system; and a control unit 7 (control means) that centrally controls the entire system.

The fuel cell 2 is, for example, a polymer electrolyte fuel cell and has a stack structure (cell stack body) in which a lot of unit cells are stacked. The unit cells each have a cathode (air electrode) on one surface of an electrolyte constituted from an ion-exchange membrane and an anode (fuel electrode) on the other surface of the electrolyte. The unit cell further includes a pair of separators which sandwich the anode and the cathode therebetween. In this configuration, the fuel gas is supplied to a fuel gas flow path in one separator, while the oxidant gas is supplied to an oxidant gas flow path in the other separator, and these reaction gases chemically react with each other to generate electric power. The fuel cell 2 is provided with a voltage sensor V that detects an output voltage of the fuel cell and a current sensor A that detects an output current of the fuel cell 2.

The oxidant gas piping system 3 includes: a compressor 31 that compresses the air introduced through a filter and sends out the compressed air as the oxidant gas; an oxidant gas supply flow path 32 for supplying the oxidant gas to the fuel cell 2; and an oxidant-off gas exhaust flow path 33 for exhausting the oxidant-off gas exhausted from the fuel cell 2. The oxidant-off gas exhaust flow path 33 is provided with an air back pressure valve 34 that regulates the pressure of the oxidant gas in the fuel cell 2.

The fuel gas piping system 4 includes: a fuel tank 40 serving as a fuel supply source which stores fuel gas having a high pressure; a fuel gas supply flow path 41 for supplying the fuel gas in the fuel tank 40 to the fuel cell 2; and a fuel circulation flow path 42 for returning a fuel-off gas exhausted from the fuel cell 2 to the fuel gas supply flow path 41. The fuel gas supply flow path 41 is provided with a pressure regulating valve 43 that regulates the pressure of the fuel gas to a preset secondary pressure, and the fuel circulation flow path 42 is provided with a fuel pump 44 that pressurizes the fuel-off gas in the fuel circulation flow path 42 and sends the fuel gas towards the fuel gas supply flow path 41.

The cooling system 5 includes: a radiator 51 and a radiator fan 52 that cool the cooling water; a cooling water circulation flow path 53 for circulating and supplying the cooling water to the fuel cell 2 and the radiator 51; and a cooling water pump 54 that circulates the cooling water in the cooling water circulation flow path 53. The outlet side of the fuel cell 2 of the cooling water circulation flow path 53 is provided with a temperature sensor T1 that detects the temperature of the cooling water discharged from the fuel cell 2, and the inlet side of the fuel cell 2 of the cooling water circulation flow path 53 is provided with a temperature sensor T2 that detects the temperature of the cooling water that flows into the fuel cell 2.

The electric power system 6 includes: a DC/DC converter 61; a battery 62 which is a secondary battery; a traction inverter 63; a traction motor 64; and various auxiliary inverters which are not shown. The DC/DC converter 61 is a direct-current voltage converter, which has: a function of regulating a direct-current voltage input from the battery 62 and outputting the regulated voltage to the traction inverter 63; and a function of regulating a direct-current voltage input from the fuel cell 2 or the traction motor 64 and outputting the regulated voltage to the battery 62.

The battery 62 includes stacked battery cells and provides a certain high voltage as a terminal voltage, the battery 62 being capable of being charged with surplus power and supplying electric power in an auxiliary manner under the control of a battery computer (not shown). The traction inverter 63 converts a direct current to a three-phase alternating current, and supplies the three-phase alternating current to the traction motor 64. The traction motor 64 is, for example, a three-phase alternating current motor, which serves as a main power source for, for example, a fuel cell hybrid vehicle equipped with the fuel cell system 1. The auxiliary inverters are electric motor control units which control the drive of respective motors, and the auxiliary inverters convert a direct current to a three-phase alternating current and supply the three-phase alternating current to the respective motors.

The control unit 7 detects the amount of operation of an acceleration member (an accelerator) provided in a fuel cell hybrid vehicle, receives control information such as an acceleration request value (e.g., the amount of power generation required by power-consuming apparatuses such as the traction motor 64), and controls the operation of various appliances in the system. Examples of the power-consuming apparatuses may include, in addition to the traction motor 64, auxiliary apparatuses required for operating the fuel cell 2 (e.g., motors for the compressor 31, fuel pump 44, cooling water pump 54 and radiator fan 52, etc.); actuators used in various apparatuses relevant to the travel of the vehicle (e.g., a speed change gear, a wheel control apparatus, a steering gear and a suspension); and an air-conditioning apparatus (air conditioner), lighting equipment, audio system, etc. which are provided in a passenger compartment.

The control unit 7 physically includes, for example: a CPU; a memory 70; and an input-output interface. The memory 70 includes, for example, a ROM that stores a control program and control data which are processed by the CPU and a RAM primarily used as various work areas for control processing. These elements are connected to each other via a bus. The input-output interface is connected to various sensors such as the temperature sensors T1 and T2, as well as various drivers, for example, for driving the cooling water pump 54, etc.

The CPU receives detection results in the respective sensors via the input-output interfaces, and processes the received detection results using various types of data in the RAM, in accordance with the control program stored in the ROM, thereby performing the control process of the cooling water pump which will be described later. The CPU outputs control signals to the various drivers via the input-output interfaces, thereby controlling the entire fuel cell system 1.

The control unit 7 functionally includes: a temperature rise speed calculation unit 71 (target temperature rise speed calculation means); and a drive control unit 72 (drive control means). The memory 70 of the control unit 7 stores various maps referenced by the temperature rise speed calculation unit 71 and the drive control unit 72.

The temperature rise speed calculation unit 71 calculates the temperature rise speed and the target temperature rise speed of the fuel cell 2. The temperature rise speed, for example, can be calculated using the temperature of the fuel cell 2. More specifically, the temperature rise speed can be calculated by obtaining values of the temperature sensor T1 for every predetermined interval and calculating the degree of change.

The target temperature rise speed, for example, can be calculated using the water content of the fuel cell and the temperature of the fuel cell. More specifically, the target temperature rise speed, for example, can be calculated by referencing the maps that associate the water content of the fuel cell with the target pressure rise speed of the fuel cell for each temperature of the fuel cell and stores the result.

The target temperature rise speed that is stored in the map is set to be lower as the water content of the fuel cell decreases and higher as the water content of the fuel cell increases and is set to be lower as the temperature of the fuel cell increases and higher as the temperature of the fuel cell decreases. That is, since the possibility of the product water freezing is low when the water content of the fuel cell is small and the temperature of the fuel cell is high, the target temperature rise speed is decreased to improve the operational efficiency. On the other hand, since the possibility of the product water freezing is high when the water content of the fuel cell is high and the temperature of the fuel cell is low, the target temperature rise speed is increased to rapidly raise the temperature.

For example, a value of a temperature sensor T1 can be used as the temperature of the fuel cell that is used when calculating the target temperature rise speed. The water content of the fuel cell that is used when calculating the target temperature rise speed, for example, can be calculated using the integrated value of the output current of the fuel cell 2. More specifically, the following formula 1 is used to calculate the target temperature rise speed.

[Formula 1]

$$h = h_0 + \Sigma I_{FC} \times a \qquad \text{Formula 1}$$

The h in the above formula 1 is the water content of the fuel cell, $h_0$ is the initial value of the water content, $I_{FC}$ is the output current of the fuel cell, and a is the conversion factor.

The initial value $h_0$ of the above formula 1 may use, when starting the fuel cell 2, the impedance of the fuel cell 2 that was measured when the fuel cell 2 was terminated last. On the other hand, when restarting the normal operation after intermittent operation of the fuel cell, the water balance in the fuel cell 2 that was calculated during the previous normal operation may be used as the initial value $h_0$ of the above formula 1. The water balance in the fuel cell 2 can be calculated by subtracting the water content that is carried away as water vapor by the oxidant gas supplied to the fuel cell 2 from the water content generated by power generation of the fuel cell 2.

By calculating the target temperature rise speed using the water content of the fuel cell 2 and the temperature of the fuel cell 2, the target temperature rise speed can be determined in accordance with the state of the fuel cell that is affected by the temperature and the water content of the fuel cell 2. Thus, it is possible to appropriately control the circulation amount of the cooling water required for preventing deterioration of the electrolyte membrane included in the fuel cell 2.

The drive control unit 72 controls the drive of the cooling water pump 54 in accordance with the target temperature rise speed and the temperature rise speed calculated by the temperature rise speed calculation unit 71. More specifically, when the temperature rise speed is below the target temperature rise speed, the drive control unit 72 controls the drive of the cooling water pump 54 such that the circulation amount of the cooling water is decreased, and when the temperature rise speed is equal to or greater than the target temperature rise speed, the drive of the cooling water pump 54 is controlled such that the circulation amount of the cooling water is increased.

By controlling the drive of the cooling water pump 54 in this manner, for example, when the water content of the fuel cell is small and the temperature of the fuel cell is high, the target temperature rise speed can be kept low by the above temperature rise speed calculation unit 71. As a result, the temperature rise speed exceeds the target temperature rise speed, and it is possible to increase the circulation amount of the cooling water. This enables the formation of a power generation concentrated portion that easily occurs when the water content of the fuel cell is small and the temperature of the fuel cell is high to be suppressed. On the other hand, when the water content of the fuel cell is large and the temperature of the fuel cell is low, the target temperature rise speed can be greatly increased by the temperature rise speed calculation unit 71. As a result, the temperature rise speed falls below the target temperature rise speed, and it is possible to decrease the circulation amount of the cooling water and prioritize the temperature rise. This enables freezing of the product water that easily occurs when the water content of the fuel cell is high and the temperature of the fuel cell is low to be suppressed.

When the value obtained by subtracting the temperature rise speed from the target temperature rise speed is equal to or greater than a first threshold value, the drive control unit 72 stops the cooling water pump 54. The first threshold value is a determination value for determining whether or not to stop the cooling water pump in order to accelerate the temperature rise of the fuel cell 2. Accordingly, for example, when taking into consideration the difference between the target temperature rise speed and the temperature rise speed, the first threshold value may be set as a limit value for determining that it is more effective to stop the cooling water pump 54 and prioritize the temperature rise of the fuel cell rather than driving the cooling water 54. This enables a rapid rise in temperature of the fuel cell 2 since the cooling water pump 54 can be stopped when the difference between the target temperature rise speed and the temperature rise speed is equal to or greater than the first threshold value.

When the value obtained by subtracting the temperature rise speed from the target temperature rise speed is equal to or smaller than a second threshold value, the drive control unit 72 drives the cooling water pump 54. The second threshold value may be set as a value equal to or smaller than the first threshold value. This enables the inside of the fuel cell 2 with an increasing temperature to be cooled and the formation of a power generation concentrated portion to be suppressed since the cooling water pump 54 can be driven again when the difference between the target temperature rise speed and the temperature rise speed is decreased to the second threshold value or lower.

It is preferable that the second threshold value is set as a value smaller than the first threshold value. This is because, if the second threshold value is set as the same value as the first threshold value, the cooling water pump 54 would frequently repeat the stop/drive of the cooling water pump 54 when the temperature rise speed varies near the threshold value. Therefore, setting the second threshold value to a value smaller than the first threshold value can prevent a frequent repetition of a control for stopping and driving the cooling water pump 54.

Figure 2:
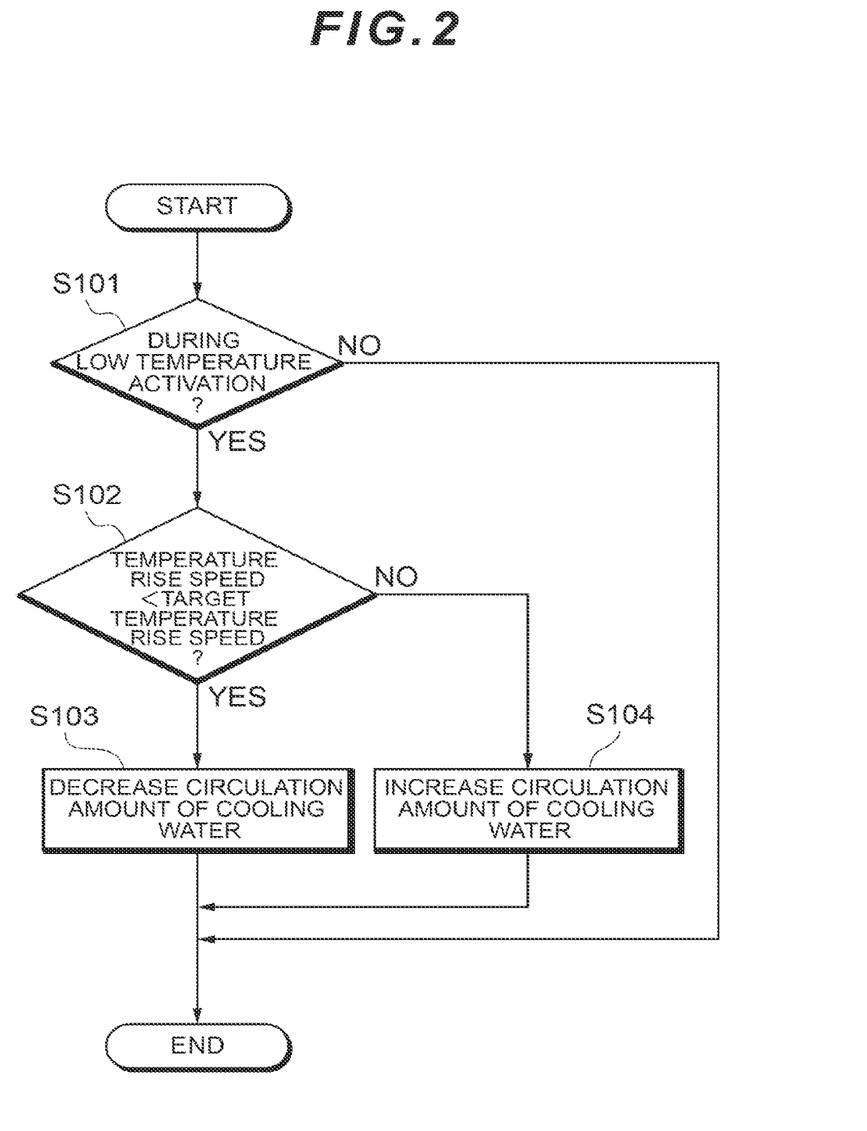
FIG. 2 is a flow chart for explaining a flow of a (first) drive control process of a cooling water pump.

Next, a (first) drive control process of a cooling water pump that is performed in a fuel cell system in an embodiment will be described below with reference to the flow chart shown in FIG. 2. This drive control process is a process repeatedly performed during an activation process that is performed when the fuel cell is activated.

First, the control unit 7 determines whether or not the fuel cell is during a low temperature activation (Step S101). When this determination is NO (Step S101; NO), the control unit 7 ends the present drive control process. The determination as to whether or not it is during a low temperature activation can be determined, for example, as described below. It is determined that the fuel cell is during a low temperature activation when the temperature detected by the temperature sensor T1 during the activation of the fuel cell 2 is equal to or smaller than a predetermined low temperature threshold value. For example, 0° C. which is a freezing point may be used as the predetermined low temperature threshold value.

On the other hand, when it is determined that the fuel cell is during a low temperature activation in the determination in the above Step S101 (Step S101; YES), the drive control unit 72 determines whether or not the temperature rise speed is below the target temperature rise speed (Step S102).

When it is determined that the temperature rise speed is below the target temperature rise speed in this determination (Step S102; YES), the drive unit 72 controls the drive of the cooling water pump 54 such that the circulation amount of the cooling water is decreased (Step S103).

On the other hand, when it is determined that the temperature rise speed is equal to or greater than the target temperature rise speed in the determination of the above Step S102 (Step S102; NO), the drive control unit 72 controls the drive of the cooling water pump 54 such that the circulation amount of the cooling water is increased (Step S104).

Figure 3:
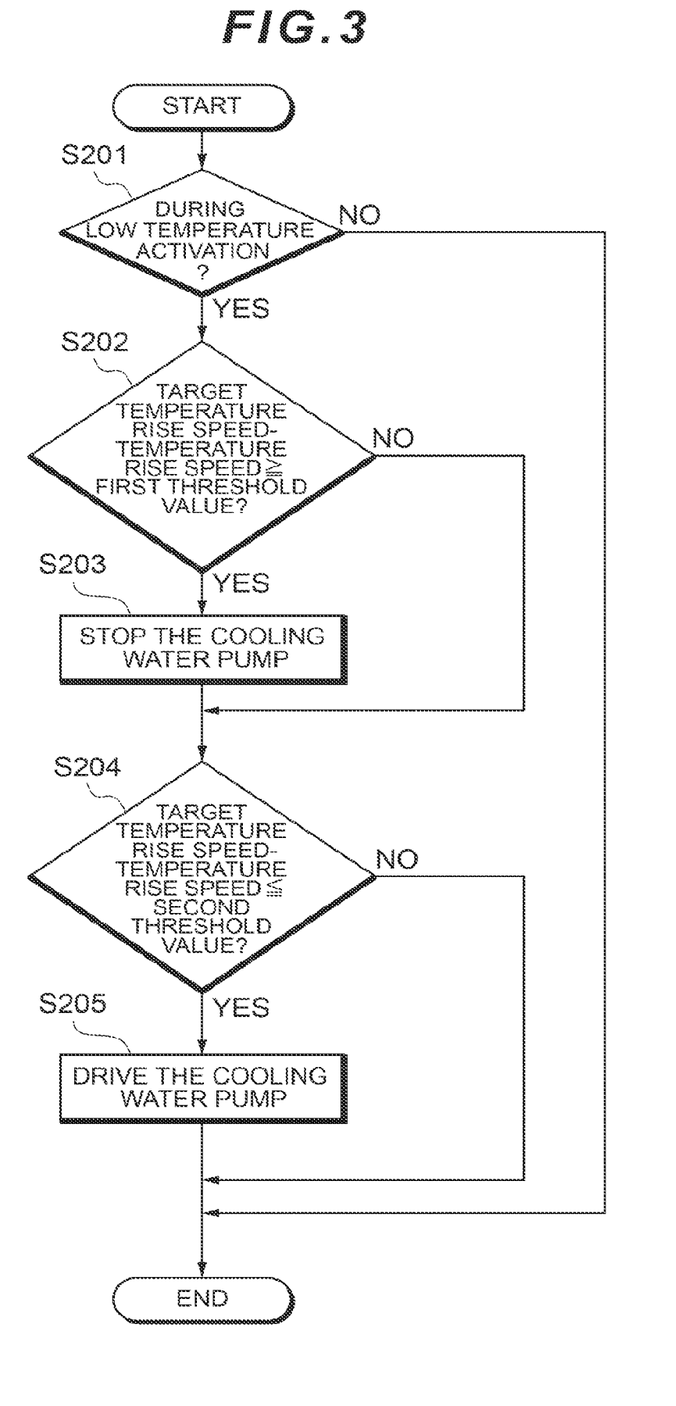
FIG. 3 is a flow chart for explaining a flow of a (second) drive control process of a cooling water pump.

A (second) drive control process of a cooling water pump that is performed in a fuel cell system in an embodiment will be described below with reference to the flow chart shown in FIG. 3. This (second) drive control process is performed in parallel with the above (first) drive control process.

First, the control unit 7 determines whether or not the fuel cell is during a low temperature activation (Step S201). When this determination is NO (Step S201; NO), the control unit 7 ends the present drive control process.

On the other hand, when it is determined that the fuel cell is during a low temperature activation in the determination in the above Step S201 (Step S201; YES), the drive control unit 72 determines whether or not the value obtained by subtracting the temperature rise speed from the target temperature rise speed calculated by the temperature rise speed calculation unit 71 is equal to or greater than the first predetermined value (Step S202). When this determination is NO (Step S202; NO), the control unit 7 proceeds to a process in Step S204 which will be described later.

On the other hand, when it is determined that the value obtained by subtracting the temperature rise speed from the target temperature rise speed is equal to or greater than the first threshold value in the determination of the above Step S202 (Step S202; YES), the drive control unit 72 stops the cooling water pump 54 (Step S203).

Subsequently, the drive control unit 72 determines whether or not the value obtained by subtracting the temperature rise speed from the target temperature rise speed calculated by the temperature rise speed calculation unit 71 is equal to or smaller than the second threshold value (Step S204). When this determination is NO (Step S204; NO), the control unit 7 ends the present drive control process.

On the other hand, when it is determined that the value obtained by subtracting temperature rise speed from the target temperature rise speed is equal to or smaller than the second threshold value in the determination of the above Step S204 (Step S204; YES), the drive control unit 72 drives the cooling water pump 54 (Step S205).

As described above, according to the fuel cell system 1 in an embodiment, since the drive of the cooling water pump 54 can be controlled in accordance with the temperature rise speed of the fuel cell 2 during a low temperature activation, even if the fuel cell is activated at a low temperature at or below the freezing point, the circulation amount of the cooling water can be increased when the temperature rise speed of the fuel cell 2 is high. Therefore, a situation where the circulation amount of the cooling water is insufficient which causes a power generation concentrated portion to be formed can be avoided, thereby enabling a suppression of the deterioration of an electrolyte membrane of the fuel cell 2.

Modification

The drive control unit 72 in the above embodiment controls the drive of the cooling water pump 54 in accordance with the target temperature rise speed and the temperature rise speed, but the method for controlling the drive of the cooling water pump 54 is not limited to such. For example, the target circulation amount of the cooling water may be calculated using the target temperature rise speed to control the drive of the cooling water pump in accordance with this target circulation amount.

A fuel cell system in the present modification will be described below. The fuel cell system in the present modification is different from the fuel cell system in the embodiment described above in that this fuel cell system is further provided, in addition to the functions of the control unit 7 in the embodiment described above, with a circulation amount calculation unit 73 which will be described later. Since the other configurations are the same as the respective configurations in the embodiment, the difference between the embodiment and the modification will be mainly described below.

Figure 4:
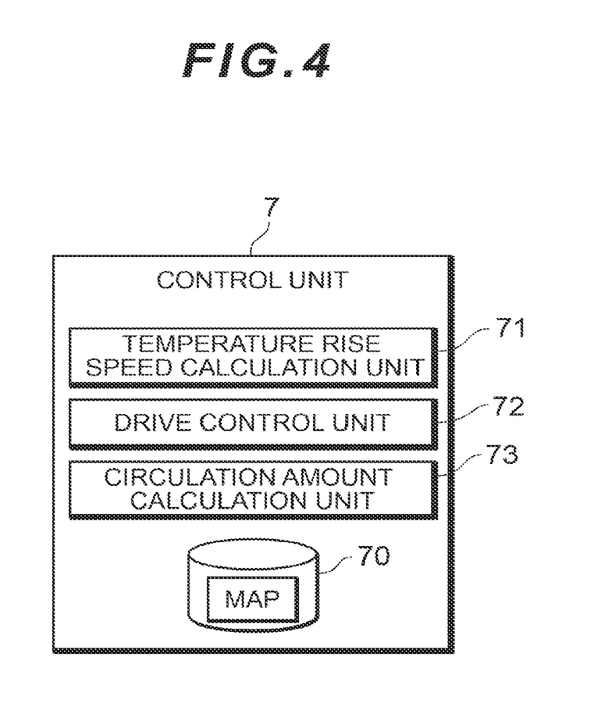
FIG. 4 is a diagram showing a functional configuration of a control unit in a modification.

The control unit 7 in the present modification as shown in FIG. 4 includes the above temperature rise speed calculation unit 71 and drive control unit 72, and a circulation amount calculation unit 73 (target circulation amount calculation means).

The circulation calculation unit 73 calculates the target circulation amount of the cooling water using the target temperature rise speed calculated by the temperature rise speed calculation unit 71. The circulation amount calculation unit 73 can calculate the target circulation amount of the cooling water using, for example, the below formulas 2 to 4. More specifically, the target circulation amount of the cooling water can be calculated by substituting the below formulas 3 and 4 into the below formula 2 and determining the circulation amount Y of the cooling water, and then setting the target circulation amount of the cooling water to be equal to or smaller than the circulation amount Y of the cooling water.

[Formula 2]

$$\frac{S}{C_{FC}} = Q_{FC} - Q_{OUT} \qquad \text{Formula 2}$$

The S in the above formula 2 is the target temperature rise speed [K/sec], $C_{FC}$ is the heat capacity [kJ/K] of the fuel cell, $Q_{FC}$ is the amount of heat generation [kW] of the fuel cell, and $Q_{out}$ is the amount of discharge [kW] of the fuel cell.

[Formula 3]

$$Q_{FC}=[(V_T \times n)-V_{FC}] \times I_{FC} \div 1000 \qquad \text{Formula 3}$$

The $Q_{FC}$ of the above formula 3 is the amount of heat generation [kW] of the fuel cell, $V_T$ is the theoretical electromotive voltage [V] when generating heat in a unit cell, n is the number of unit cells included in the fuel cell, $V_{FC}$ is the output voltage [V] of the fuel cell, and $I_{FC}$ is the output current of the fuel cell. The amount of heat generation $Q_{FC}$ of the fuel cell can be determined using the current temperature of the fuel cell and the current water content of the fuel cell. Therefore, the correlation thereof may be derived in advance by experiments, etc. and stored in a map, and then the amount of heat generation $Q_{FC}$ of the fuel cell may be calculated with reference to this map.

[Formula 4]

$$Q_{OUT}=k \times (T_{IN}-T_{OUT}) \times Y \qquad \text{Formula 4}$$

The $Q_{out}$ of the below formula 4 is the amount of discharge [kW] of the fuel cell, k is the specific heat [kJ/kgK] of the cooling water, $T_{IN}$ is the cooling water temperature at the fuel cell inlet side, $T_{OUT}$ is the cooling water temperature at the fuel cell outlet side, and Y is the flow rate [kg/sec] of the cooling water.

The drive control unit 72 in the present modification controls the drive of the cooling water pump 54 in accordance with the target circulation amount of the cooling water calculated by the circulation amount calculation unit 73. That is, the drive control unit 72 controls the drive of the cooling water pump 54 in accordance with the target circulation amount of the cooling water calculated using the target temperature rise speed S. This enables a more accurate control of the circulation amount of the cooling water.

INDUSTRIAL APPLICABILITY

The fuel cell system according to the present invention is suitable for suppressing the deterioration of an electrolyte membrane of a fuel cell.

DESCRIPTION OF REFERENCE NUMERALS

1 . . . Fuel cell system; 2 . . . Fuel cell; 3 . . . Oxidant gas piping system; 4 . . . Fuel gas piping system; 5 . . . Cooling system; 6 . . . Electric power system; 7 . . . Control unit; 53 . . . Cooling water circulation flow path; 54 . . . Cooling water pump; 70 . . . Memory; 71 . . . Temperature rise speed calculation unit; 72 . . . Drive control unit; 73 . . . Circulation amount calculation unit; T1 . . . Temperature sensor; T2 . . . Temperature sensor; V . . . Voltage sensor; A . . . Current sensor.

What is claimed is:
1. A fuel cell system comprising:
   a fuel cell that is supplied with a reactant gas and generates electric power through an electrochemical reaction of the reactant gas;
   a cooling water circulation flow path for circulating and supplying cooling water to the fuel cell;
   a cooling water pump for circulating the cooling water in the cooling water circulation flow path;
   a target temperature rise speed calculation unit programmed to calculate a target temperature rise speed of the fuel cell using a temperature of the fuel cell and a water content of the fuel cell, the target temperature rise speed of the fuel cell being lower as the temperature of the fuel cell increases and the water content of the fuel cell decreases and the target temperature rise speed of the fuel cell being higher as the temperature of the fuel cell decreases and the water content of the fuel cell increases;

a target circulation amount calculation unit programmed to calculate a target circulation amount of the cooling water using the target temperature rise speed; and a drive control unit programmed to control, during an activation below a freezing point, a drive of the cooling water pump in accordance with the target circulation amount.

2. The fuel cell system according to claim 1, wherein the drive control unit is programmed to stop the cooling water pump when a value obtained by subtracting the temperature rise speed of the fuel cell from the target temperature rise speed is equal to or greater than a predetermined first threshold value.

3. The fuel cell system according to claim 2, wherein the drive control unit is programmed to drive the cooling water pump when the value obtained by subtracting the temperature rise speed of the fuel cell from the target temperature rise speed is equal to or smaller than a second threshold value which is a value that is equal to or smaller than the first threshold value.

4. The fuel cell system according to claim 1, further comprising a temperature sensor that is provided at the cooling water circulation flow path and measures a temperature of the cooling water, wherein the drive control unit determines whether or not the fuel cell is during an activation below a freezing point based on the temperature detected by the temperature sensor during an activation of the fuel cell.

* * * * *